(12) United States Patent
Bouis

(10) Patent No.: US 7,680,068 B1
(45) Date of Patent: Mar. 16, 2010

(54) SYSTEM AND METHOD FOR ARTERY NODE SELECTION IN AN AD-HOC NETWORK

(75) Inventor: Jeffrey D. Bouis, Frisco, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1027 days.

(21) Appl. No.: 11/224,823

(22) Filed: Sep. 13, 2005

(51) Int. Cl.
*H04L 12/28* (2006.01)

(52) U.S. Cl. ............. 370/255; 370/351; 370/401; 709/208; 709/209

(58) Field of Classification Search .............. 370/254, 370/255, 401
See application file for complete search history.

(56) References Cited

U.S. PATENT DOCUMENTS 7,184,421 B1 * 2/2007 Liu et al. ............... 370/338

2004/0003111 A1 * 1/2004 Maeda et al. ............ 709/237
2005/0060287 A1 * 3/2005 Hellman et al. ............ 707/2

* cited by examiner

*Primary Examiner*—Daniel J Ryman
*Assistant Examiner*—Jae Y Lee
(74) *Attorney, Agent, or Firm*—Matthew J. Evans; Daniel M. Barbieri

(57) ABSTRACT

A system for optimizing an ad-hoc network. The system includes a plurality of nodes, wherein each node includes a computer implemented application configured to determine whether the present node is a link node such that the present node is the only node connecting at least one pair of nodes in the ad-hoc network, determine a connection number for the present node, wherein the connection number is the number of pairs of nodes connected by the present node not including pairs of nodes connected by link nodes, and determine whether the present node should be classified as an artery node based on the link node and connection number classifications.

20 Claims, 6 Drawing Sheets

SYSTEM AND METHOD FOR ARTERY NODE SELECTION IN AN AD-HOC NETWORK

BACKGROUND OF THE INVENTION

The present invention relates generally to the field of ad-hoc network optimization. More particularly, the present invention relates to systems and methods for efficiently allocating bandwidth utilizing a connected backbone in an ad-hoc network.

An ad-hoc network is a cooperative engagement of a collection of mobile nodes without the required intervention of any centralized access point or existing infrastructure. The lack of a centralized access point or infra structure, although increasing robustness, can create difficulties in optimizing network performrance.

In an ad-hoc network, the concept of an artery node has proven useful for efficient network performance. Some nodes in the ad-hoc network are designated as artery nodes, and the artery nodes are allocated the majority of the bandwidth, or more specifically, they are given the majority of time within a TDMA frame.

With this property, artery nodes provide many desirable features. By possessing the majority of the bandwidth, artery nodes are the natural choices for data routing, and throughput when two nodes wish to communicate across the network. In addition, artery nodes permit the network to quickly respond to traffic bursts, or to throttle traffic as necessary, and thus provide efficient bandwidth and resource allocation.

To ensure these goals are achieved, there are two desired properties for the set of artery nodes. First, for nodes to utilize artery nodes without undue latency, every non-artery node may have at least one neighbor that is an artery node. A neighbor is any node that may be reached without requiring an intermediate node. Having each node with at least one neighbor that is an artery node permits quick response to traffic bursts, and also allows nodes to easily inject their data into the artery node "backbone" for better throughput. Second, to facilitate the use of artery nodes as the data paths of choice, it is desired that the shortest path between any two nodes in the network be along a continuous path of artery nodes.

In a network populated with artery nodes, non-artery node paths of equal or longer length between the nodes may exist, but there may not be any which are shorter. Thus an artery node ad-hoc network is characterized in part by a shortest-path property. Since a path consisting only of artery nodes is required between any two nodes, this implies that the set of artery nodes are connected.

Accordingly, there is a need for a system and method configured to implement an algorithm which, for a given network, chooses a set of artery nodes having the above properties. Yet further, there is a need for such an algorithm that is distributed such that it may be run independently by every node in the network. There is further a need for such an algorithm configured to allow a newly added node to determine if it is to be an artery node. Yet further, although many artery nodes are typically needed to satisfy the shortest-path property, it is desirable that the algorithm be implemented such that only necessary artery nodes be chosen, since they will need to contend with each other for bandwidth.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

One embodiment of the invention relates to a system for optimizing an ad-hoc network. The system includes a plurality of nodes, wherein each node includes a computer implemented application configured to determine whether the present node is a link node such that the present node is the only node connecting at least one pair of nodes in the ad-hoc network, determine a connection number for the present node, wherein the connection number is the number of pairs of nodes connected by the present node not including pairs of nodes connected by link nodes, and determine whether the present node should be classified as an artery node based on the link node and connection number classifications.

Another embodiment of the invention relates to a computer implemented method for optimizing an ad-hoc network. The method includes determining whether a present node is a link node such that the present node is the only node connecting at least one pair of nodes in the ad-hoc network, determining a connection number for the present node, wherein the connection number is the number of pairs of nodes connected by the present node not including pairs of nodes connected by link nodes, and determining whether the present node should be classified as an artery node based on the link node and connection number classifications.

Yet another embodiment of the invention relates to a program product for optimizing an ad-hoc network, comprising machine-readable program code for causing, when executed, one or more machines to perform the following method steps. The steps include determining whether the present node is a link node such that the present node is the only node connecting at least one pair of nodes in an ad-hoc network, determining a connection number for the present node, wherein the connection number is the number of pairs of nodes connected by the present node not including pairs of nodes connected by link nodes, and determining whether the present node should be classified as an artery node based on the link node and connection number classifications.

Alternative examples of other exemplary embodiments are also provided which relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
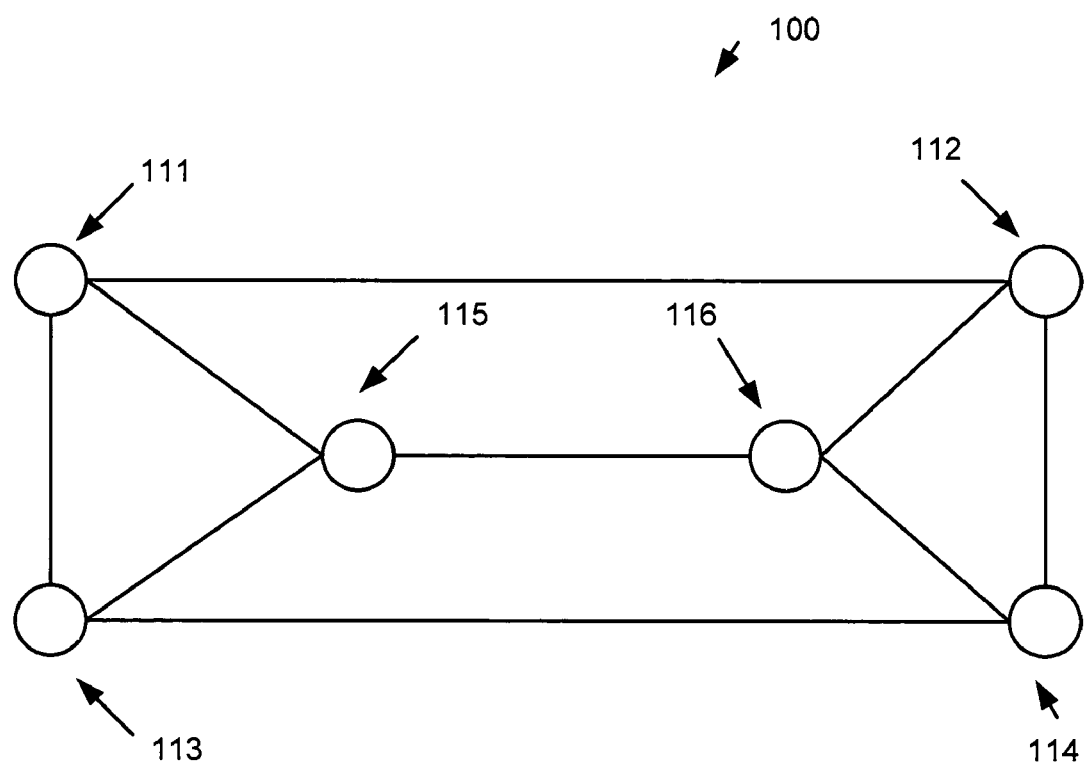
FIG. 1 is a block diagram illustrating a simple ad-hoc network, according to an exemplary embodiment.

Before describing in detail the particular improved system and method, it may be observed that the invention includes, but is not limited to, a novel structural combination of conventional data/signal processing components and communications circuits, and not in the particular detailed configurations thereof. Accordingly, the structure, methods, functions, control, and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiment depicted in the exemplary diagrams, but may be construed in accordance with the language in the claims.

Referring now to FIG. 1, a block diagram illustrating a simple ad-hoc network 100 is shown, according to an exemplary embodiment. Network 100 includes a first node 111, a second node 112, a third node 113, a fourth node 114, a fifth node 115, and a sixth node 116. Each node in the ad-hoc network may a computing device configured to communicate over the network. Each node further has a unique node id associated with it. Each node is configured to implement an artery node selection algorithm to optimize network performance.

Embodiments of the present invention may be practiced in a networked environment using logical connections to one or more remote computing systems having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PC's, mini-computers, mainframe computers, and the like. Embodiments of the invention may also be practiced in distributed computing environments where tasks are performed by local and remote processing devices that are linked (either by hardwired links, wireless links or by a combination of hardwired and wireless links) through a communications network. In a distributed computing environment, program modules may be located in both local and remote memory storage devices.

Nodes 111-116 may be configured to utilize a standard synchronous model of communication which proceeds in cycles: in each cycle, every node can exchange messages with its neighbors, and perform a local computation, and these cycles are synchronized among all nodes in the network. Algorithmic time complexity is measured by the number of cycles required.

According to an exemplary embodiment, network 100 inherently includes a dominating set. A dominating set is a set of nodes such that any node in the network is within one hop of a dominator. If the set of dominators is connected in the network, this is a connected dominating set. Referring, to FIG. 1, nodes 115 and 116 may be a representative dominating set. A set of artery nodes forms a connected dominating set in the ad-hoc network.

A connected dominating set having the smallest number of dominators possible for a given network is called the minimum connected dominating set. However, computing a minimum connected dominating set is known to be a complicated calculation involving numerous computing cycles. Accordingly, determining a minimum connected dominating set is at odds with the principals of an ad-hoc network wherein nodes drop in and out and computing is distributed. Further, computing a minimum connected dominating set may also be at odds with the shortest path property desired of artery nodes. Referring again to FIG. 1, the minimum connected dominating set for this network is the set of nodes 115 and 116, yet the shortest path between any of the remaining nodes 111-114 is not though nodes 115 and 116. The shortest path is a direct connection. For example, nodes 111 and 114 are only two hops apart (via nodes 112 or 113), yet three hops via nodes 115 and 116. Although network 100 is a simple example, in larger, more realistic networks the difference in the number of hops can be dramatic. Therefore, an approximate minimum connected dominating set is not only computationally complex in time and messaging, it can actually be too minimal for establishing a shortest-path connected dominating set of artery nodes. Accordingly, the artery node selection method may be configured to generate as few artery nodes as possible subject to the shortest-path connected dominating set constraint.

Accordingly, in order to select the artery nodes, each node in network 100 may be assigned a connection number. The connection number is the count of the number of pairs of nodes connected to a given node not including those pairs that are connected by a link node. Link nodes are nodes which are required by the network topology itself to be dominators, further discussed below with reference to FIG. 3. Not including the link nodes when determining the connection number assigned to each node will produce a smaller number of initial dominators, as also further discussed below.

Figure 2A:
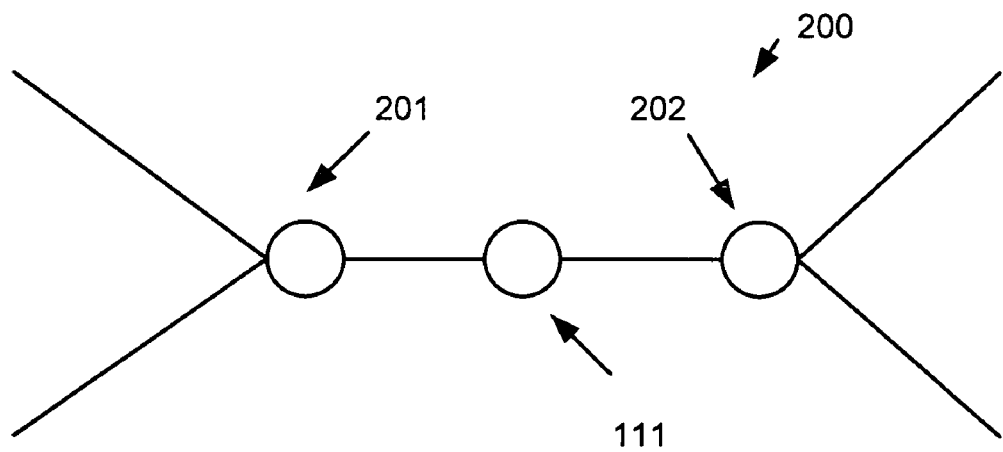
FIGS. 2A and 2B are two different embodiments of a sub-section of a second exemplary ad-hoc network, according to an exemplary embodiment.
Figure 2B:
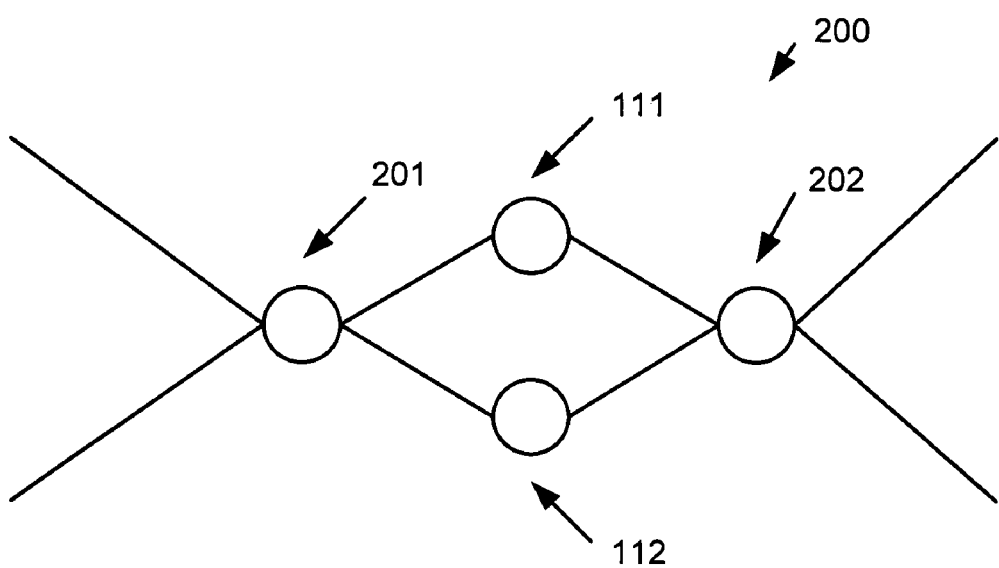

Referring now to FIGS. 2a and 2b, two different embodiments of sub-section of a second exemplary ad-hoc network 200 are shown, according to an exemplary embodiment. FIG. 2a including first node 111 and first neighbor node 201 and second neighbor node 202. Similarly, FIG. 2b includes first node 111 and second node 102 and first neighbor node 201 and second neighbor node 202.

A distance dist (111,112) is the smallest number of hops between nodes 111 and 112 in the network 100. An open neighbor set N(111) is the set of all 1-hop neighboring nodes of node 111. A closed neighbor set N[111] is the set of all neighbors of node 111 plus node 111 itself. Network 200 may be configured such that each node receives messages indicating its 2-hop neighborhood, or, more specifically, the node ids of each of its' 1-hop neighbors, and the I-hop neighbors of each 1-hop neighbor.

Given a set of nodes composing a networks, the nodes are configured to create a connected dominating set of artery nodes where the shortest path between any two nodes 201 and 202 in the network is via a path of artery nodes when dist(201, 202)>1. The selection algorithm can achieve these properties by ensuring that if dist(201,202) 2 then at least one node that is between nodes 201 and 202 is an artery node. A node selected to be an artery node is referred to as an active artery node.

For example, wherein there is only one path—and hence only one node—between 201 and 202, as shown in FIG. 2a that node may be designated as a link node. A node is a link node if any two neighbors of the node have no common neighbors besides that node. Referring to FIG. 2(a), node 111 is a link node in that embodiment.

However, referring to FIG. 2(b) there are two nodes, 111 and 112, which are common neighbors to node 201 and node 202, so neither of them is a link node. In general, a link node is important because it is the only node between two other specific nodes. Accordingly, to maintain the shortest-path property of the artery node network, a link node is required to become an artery node.

After identifying the link nodes in an ad-hoc network, a determination is made to find out how many pairs of nodes a node joins in a useful way, i.e., the connection number of the node. Specifically, a node connects two neighbor nodes in a meaningful way if the two neighbor nodes are 1-hop neighbors of the node but are not directly connected to each other. The connection number of a node is the number of pairs of neighbors of the node which are not directly connected to each other and are also not connected by a link node. The requirement that the nodes are also not connected by a link node reduces the number of nodes chosen as artery nodes, as shown below.

Figure 3:
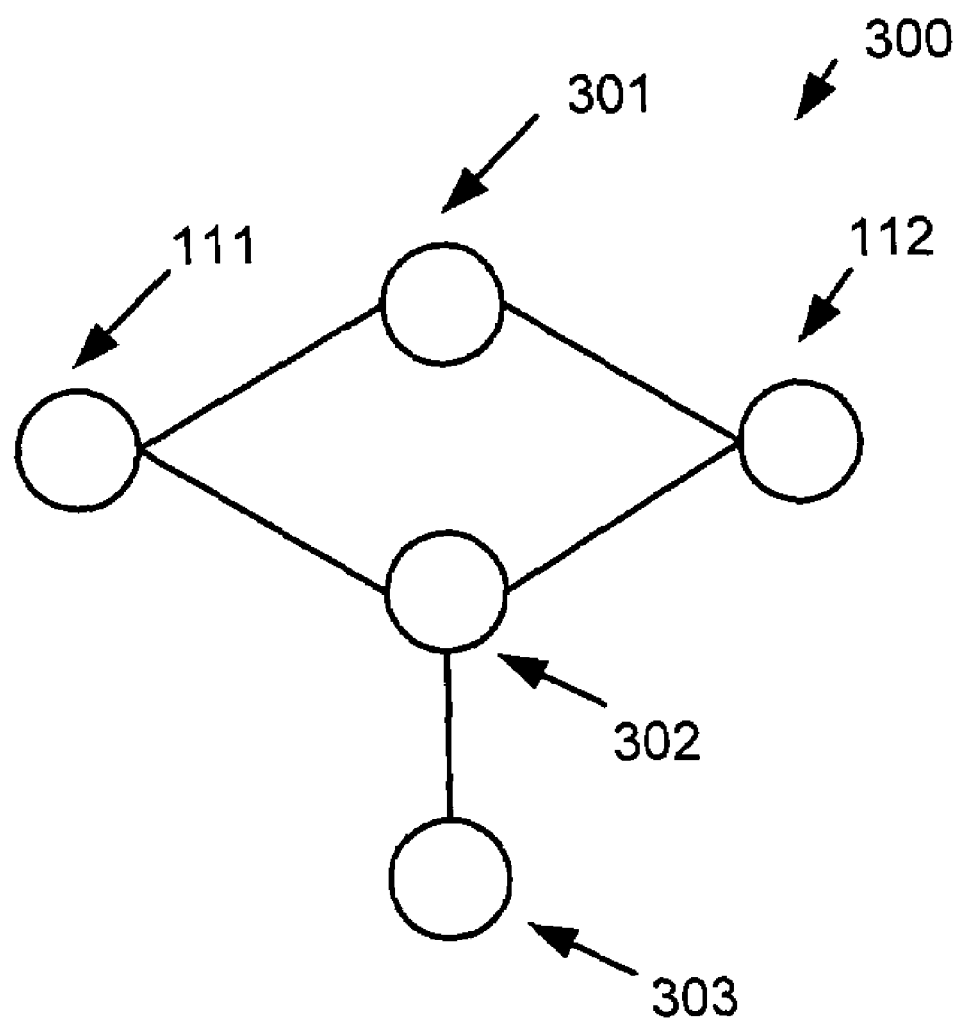
FIG. 3 is a third exemplary ad-hoc network, according to an exemplary embodiment.

Referring now to FIG. 3, a third exemplary ad-hoc network 300 is shown, according to an exemplary embodiment. Within network 300, node 301 connects a pair consisting of nodes 111 and 112. Second node 302 also connects the pair consisting of nodes 111 and 112. However, second node 302 is also a link node because it is the only node connecting node 111 to node 303 and node 112 to node 303. Since link node 302 is required to be an artery node, there is no reason for node 301 to consider becoming one to handle the path between nodes 111 and 112. Accordingly, node 301 doesn't include the connection between nodes 111 and 112 when determining its connection number.

Each pair of nodes is an unordered pair, such that the pair of nodes 301 and 302 is the same as the pair of node 302, and 301 and may not be counted twice when determining the connection number. In general, the connection number serves as a metric of the "usefulness" of a node, since a node with a high connection number usefully connects many different pairs of nodes. However, since link nodes are the most useful of all nodes in this context, the connection number of a link node is ∞.

The connection number provides a way for each node to consistently rank itself against other nodes using the selection method to determine if it may be an artery node or not, described below further with reference to FIG. 5. In particular, for nodes 301 and 302, if dist(301,302)=2 then there is at least one intermediate node between nodes 301 and 302. The intermediate node having the highest connection number will become an artery node. If one of the intermediate nodes between 301 and 302 is a link node then the link node will be an artery node for {301,302} since ∞ is larger than any finite number.

Figure 4:
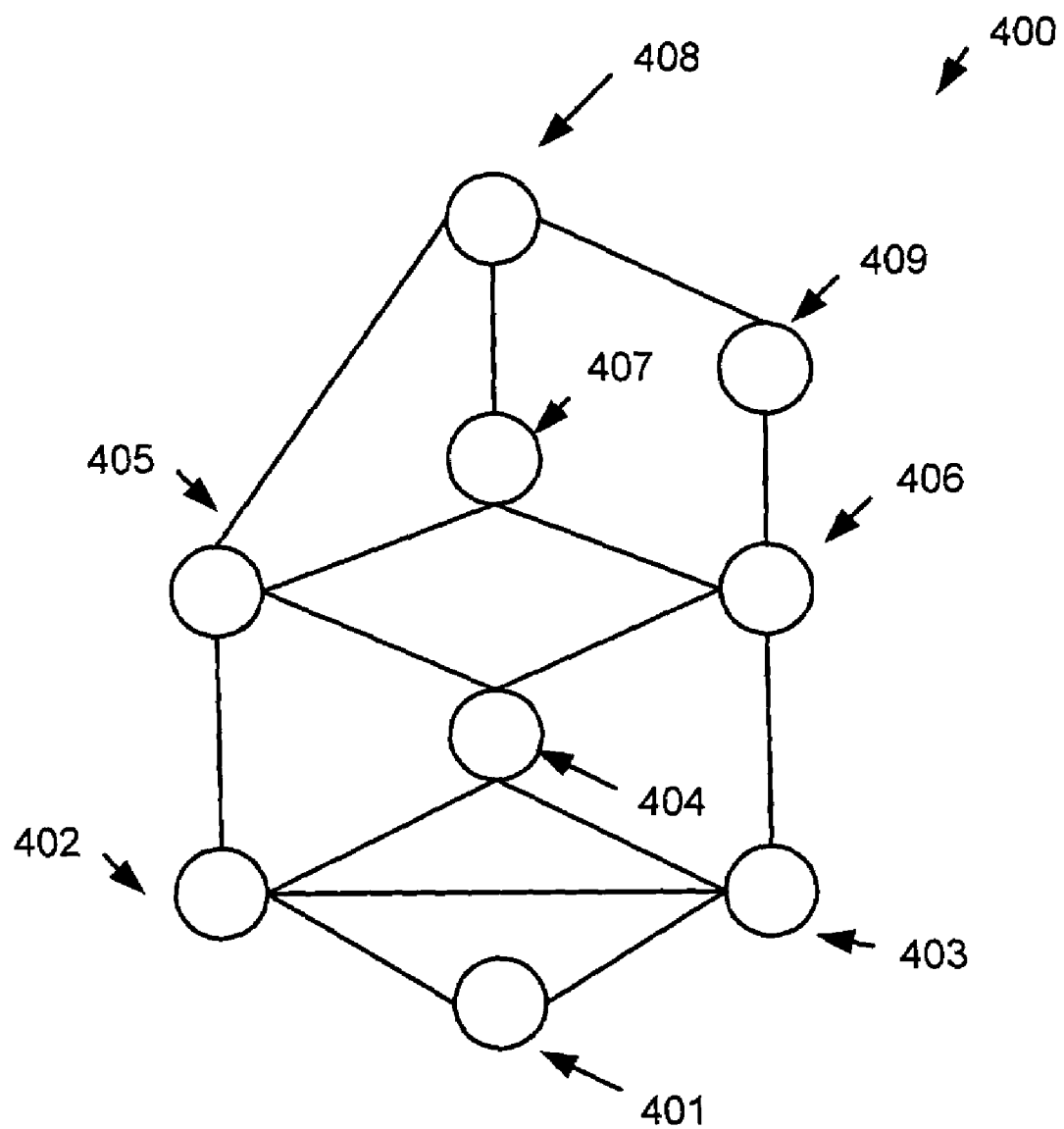
FIG. 4 is an fourth exemplary ad-hoc network, according to an exemplary embodiment.

Referring now to FIG. 4, an fourth exemplary ad-hoc network 400 is shown, according to an exemplary embodiment. Network 400 includes several nodes that have been identified as link nodes, specifically nodes 402, 403, 405, 406 and 408 are link nodes. The non-link nodes and their respective connection numbers are as follows: node 409 only connects nodes 408 and 406 so it has a connection number of 1, node 407 connects nodes 406 and 408 and nodes 405 and 406 so its connection number is 2, and node 401 doesn't connect any pairs since nodes 402 and 403 are already connected to each other. Finally, node 404 technically connects 3 pairs: nodes 403 and 405, nodes 402 and 406, and nodes 405 and 406. However, nodes 403 and 405 are already connected by link node 402, and similarly nodes 402 and 406 are already connected by link node 403, hence node 404 does not count those pairs when determining its connection number, leading to a final value of 1, for connecting nodes 405 and 406.

Once all nodes have shared their connection numbers with their 2-hop neighbors, the non-link nodes can determine their artery node status. Node 409 determines that both it and node 407 connect nodes 406 and 408, but 407 has a higher connection number, so node 409 will not become an artery node. Similarly, node 404 determines that it and node 407 both connect nodes 405 and 406, but again node 407 has a higher connection number so node 404 will not become an artery node. Node 407 makes these same calculations, determines that it has the highest connection number, and so becomes an artery node.

As shown above, if node 404 had not accounted for link nodes when determining its connection number, it would have a connection number of 3 and hence would be unnecessarily chosen as an artery node to connect nodes 405 and 406. A pruning technique would eventually remove node 404 from the list of artery nodes, but at the cost of time. By taking the known local network topology into account, the present selection algorithm generates a smaller set of artery nodes much more quickly.

Figure 5:
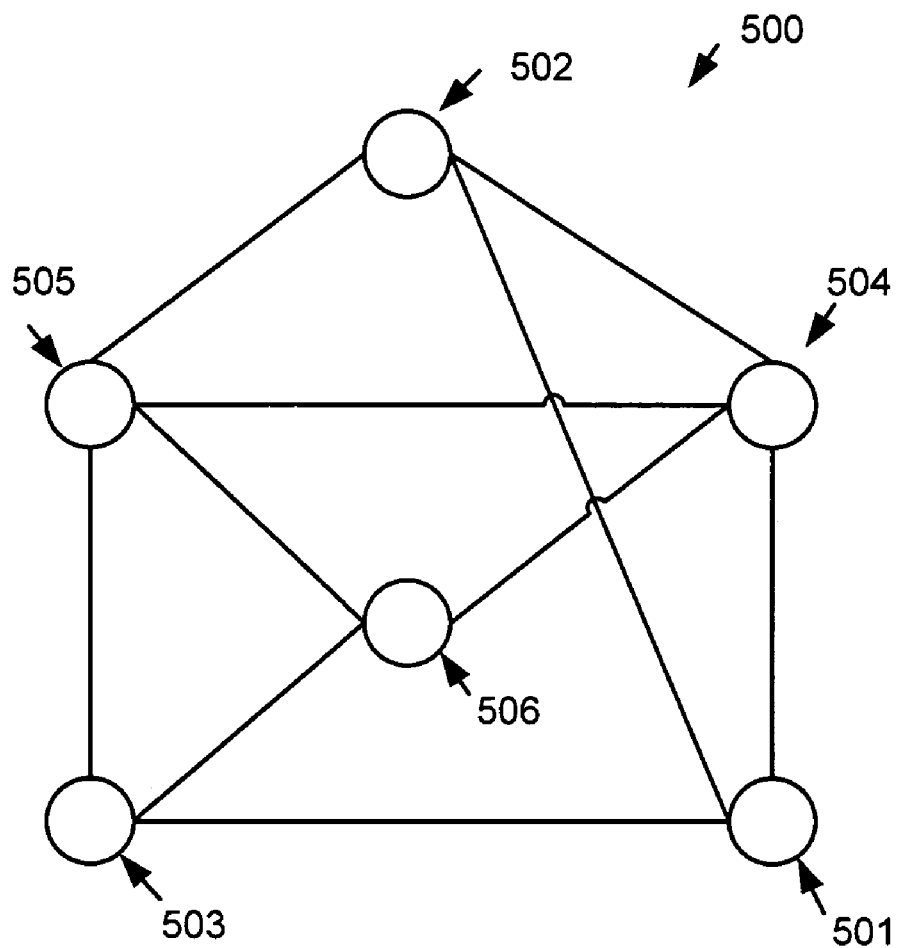
FIG. 5 is a fifth exemplary ad-hoc network having a plurality of link nodes, according to an exemplary embodiment.

Referring now to FIG. 5, an fifth exemplary ad-hoc network 500 is shown, according to an exemplary embodiment. In this network there are no link nodes, all nodes are within two hops, and all nodes have the same connection number, which means that artery node selection is based solely on node id. In this exemplary network, nodes 503, 504, 505, and 506 will be selected as artery nodes. In particular node 504 becomes an artery node only to connect the pair of neighboring nodes 506 and 501. Node 503 also happens to connect the same pair of neighbor nodes 506 and 501, but node 503 actually became an artery node to connect a different pair of neighbor nodes, specifically neighbor node 505 and 501. Since there are no other artery nodes connecting nodes 505 and 501, artery node 503 will remain an artery node. However, node 504 becomes redundant since node 503 may serve as the artery node between neighbor nodes 506 and 501. If node 504 ceases to be an artery node, all pairs of neighboring nodes it connects will still be connected by other artery nodes. Accordingly, node 504 may remove itself from active artery node status.

In the general case, consider a first node may connect a first neighbor nodes and a second neighbor node, where the first node is not a link node, the first and second neighbor nodes are two hops apart from each other and also not connected by a link node. Since the first node is not a link node, there must be at least one other non-link node which also connects the first and second neighbor nodes. Now if one of those other non-link nodes, hereinafter a second node, is an artery node but with a lower connection number or equal connection number but lower node id than the first node, then the first node is a candidate to be removed from active artery node status.

The second node did not become an artery node to connect the first and second neighbor nodes since it does not have the highest connection number or highest node id. Accordingly, the second node must have become an artery node to connect some other pair of its neighbors. Wherein this situation occurs, i.e., the first and second neighbor nodes are already connected by a node which must be an artery node, then there is no reason for the first node to be an artery node for this pair. If this same situation applies to all of the first node's pairs (as it did for all of node 530's pairs in the above example) then the first node does not need to be an artery node. According, a pruning technique may be implemented to remove the active artery node status from the first node. This can happen via topology changes due to mobility or nodes joining the network, or during startup. An artery node indicated by the pruning technique may be referred to as a deprecated artery node during a waiting period wherein the removal of artery node status is confirmed. This waiting period can help maintain the stability of the network.

Implied in the above discussion is that a node is aware of other nodes in its 2-hop neighborhood functioning as artery nodes, not just link nodes. Since this fact cannot be embedded in the connection number, a node may be configured to broadcast an indication whether it is operating as an active artery node for itself and its 1-hop neighbors.

However, to ensure that the artery node network stays fully connected at all times, the pruning technique may be configured to only consider active artery nodes and not deprecated ones. According to an exemplary embodiment, as described above, first and second artery nodes may both connect first and second neighbor nodes, where the first artery node has a higher connection number than the second artery node (or an equal connection number but higher node id), and the first artery node only became an artery node to connect first and second neighbor nodes. In this situation, if the second artery node is an active artery node for some other pair then, by the pruning technique, the first artery node will become a deprecated artery node and eventually cease to function as an artery node. Now assume the second artery node's neighborhood changes, and the second artery node can stop being an artery node for that other pair (this could even happen simultaneous to a backing off). At this point, the second artery node becomes a deprecated artery node: it continues to function as an artery node for at least the waiting period, but it no longer broadcasts that it is active. In this situation, the first artery node will determine that the first and second neighbor nodes are no longer connected by an active artery node and so will quickly become an active artery node itself, well before the second artery node actually ceases its services, thus keeping the first and second neighbor nodes continuously connected by at least one artery node the entire time. If the second artery node broadcast that it was an artery node during its waiting period, without specifying active or deprecated, the first artery node would not have known to become an artery node in time, and a disconnect in the artery node network would have been present.

Figure 6:
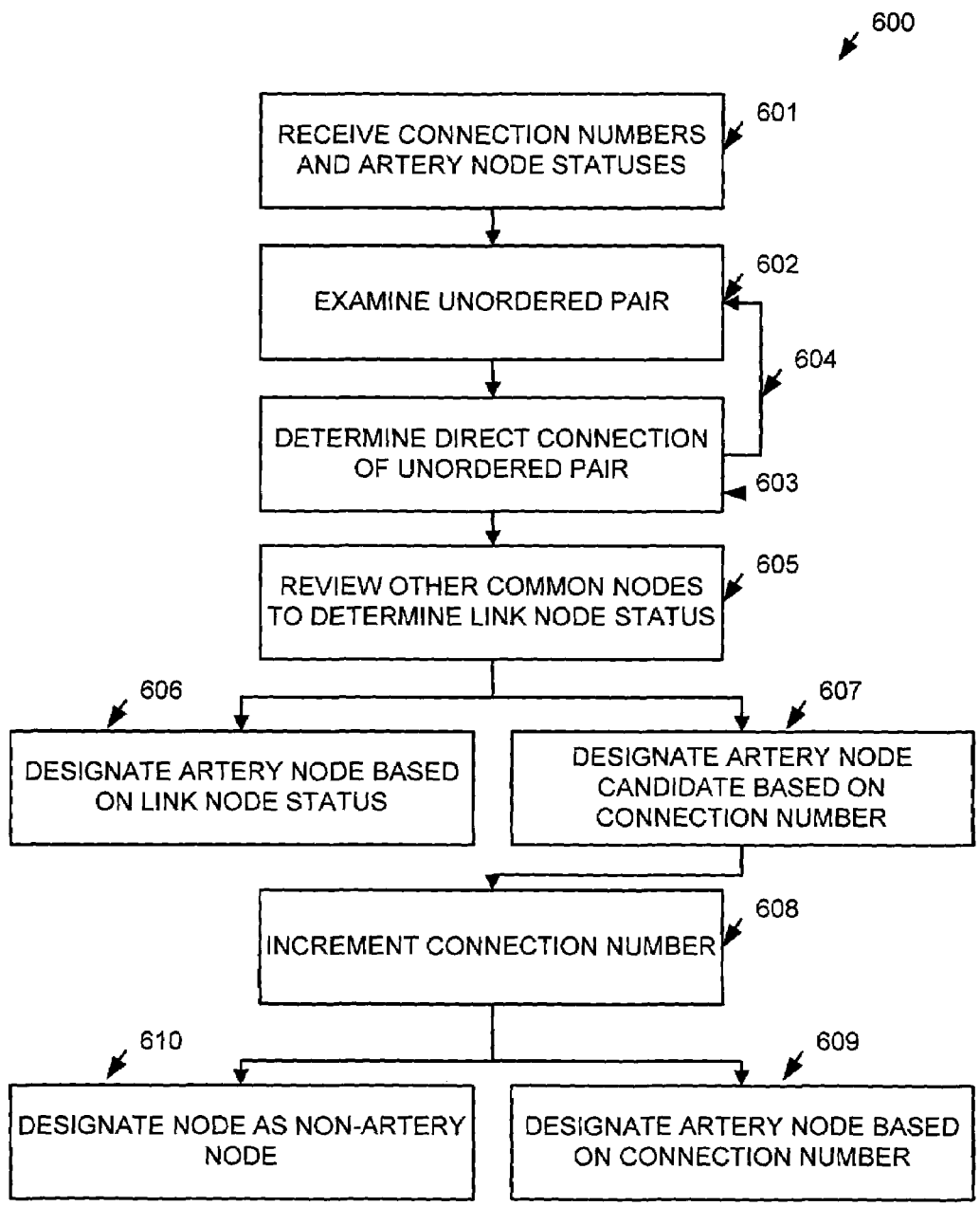
FIG. 6 is a flow chart illustrating an artery node selection method, according to an exemplary embodiment.

Referring now to FIG. 6, a flow chart 600 illustrating an artery node selection method is shown, according to an exemplary embodiment. The artery node selection method is used to determine whether the present node may designate itself as an artery node. If a node is selected by the algorithm to be an artery node (including link nodes), it may be referred to as an active artery node.

When the present node first starts in a step 601, it listens to information being broadcast to determine its neighborhood topology. Specifically, each node from which the present node receives broadcast information is a 1-hop neighbor. Further, each node may be configured to periodically broadcasts the list of its neighbors, so that once the present node hears from all neighbors it will know its 2-hop neighborhood—that is, the id of each 1-hop neighbor as well as each 1-hop neighbor's 1-hop neighbors. The present node will also participate by broadcasting the list of its own neighbors as they are discovered.

To distribute this information, each node may broadcast its connection number and active artery node status, and those of its neighbors, on a periodic basis. If the connection number an active artery node status from a 1-hop neighbor has not been received within a predetermined number of cycles, the last reported values may be broadcast instead.

In addition, the selection method may be configured to set how frequently a node may run the selection algorithm. Preferably, a node may be configured to run the algorithm, wait until it has received the latest connection numbers and active artery node statuses from its 2-hop neighborhood, then run again. If any connection numbers and active artery node statuses from its 1- or 2-hop neighbors have not been received in the predetermined number of cycles, the present node may use the last values received from those neighbors—assuming those nodes are still neighbors, as can be determined from received node id information.

By iterating the algorithm every predetermined number of cycles, a node can update its connection number and active artery node status in time to broadcast within the predetermined number of cycles. If the predetermined number is greater than one, the artery node selection method does not necessarily need to run in the same cycle as the broadcast; however, a node may be configured to not broadcast its connection number and active artery node status until just after running the algorithm, such that it may determine the correct value of its connection number and active artery node status to broadcast.

The node ids of all 2-hop neighbors can be handled slightly differently: each node may broadcast its node id, and those of its neighbors, at least once every predetermined number of cycles. Accordingly, connection numbers and active artery node statuses may be broadcast after the algorithm has run, i.e., once every predetermined number of cycles, to ensure only correct values are shared. This is possible because a node's connection number relies in part on its neighbors' connection numbers while a node's id does not change based on its neighbors' ids. Accordingly, the node's id may be broadcast more frequently without creating instability.

Accordingly, following the broadcast in step 601, the present node will hear the connection number and active artery node statuses of each of its 2-hop neighbors. Once the present node determines its own connection number and active artery node status, it will also participate in broadcasting this information.

Upon receipt of the information in step 601, the present node considers every unordered pair of neighbor nodes from its 1-hop neighborhood in a step 602. If a determination is made in a step 603 that two neighboring nodes are directly connected then the algorithm skips to the next unordered pair in a step 604.

If they are not directly connected then the present node checks if the two neighboring nodes have any neighboring nodes in common besides the present node in a step 605. This step can be performed since the present node knows the 1-hop neighborhoods of the two neighboring nodes. If there are no nodes in common besides the present node then the present node is a link node and is designated as an artery node, its connection number is set to $\infty$, its active artery node status is "true" in a step 606. The algorithm can terminate at this point.

If the present node is not a link node, it checks the common neighbors of the present pair of neighbor nodes to find the common neighbor with the highest connection number (if there are ties for highest then it considers the node with the highest id) in a step 607. If none of the common neighbor nodes have a connection number of $\infty$—i.e., if none are link nodes—then the present node is a candidate to be an artery node connecting the present neighbor nodes. In this case the present node increments its connection number counter in a step 608. When considering each of these common neighbors, the present node also checks if any of them are active artery nodes, and notes the lowest connection number found among such nodes (if there are ties for lowest then it considers the node with the lowest id). The present node stores the present pair of neighbor nodes, the highest connection number found and its corresponding node id, and the lowest connection number found among the active artery nodes and its corresponding node id, all together in memory.

The present node repeats the above steps 602-608 for each unordered pair of neighbors, without repeating. In other words, once the present node checks the present pair of neighbor nodes it will not also check a reversal of that pair.

At this point the present node has determined its connection number, so it can make its artery node determination in a step 609. The present node considers each neighbor pair that it is a candidate to connect; that is, each pair that was stored in memory earlier, along with its associated data: the highest connection number found, its corresponding node id, the lowest connection number found among active artery nodes, and its corresponding node id. If the highest connection number found is higher than the present node's, then the present node moves on to the next pair that was stored in memory. However, if the present node's connection number is higher than the one stored, or is equal but the present node has a higher node id than the stored node id, then the present node is a candidate to be an artery node.

For the pruning test, the present node now further checks if an active artery node was found and if the present node has gone more than five iterations without its own connection number changing. If so, then the present node checks if the active artery node has a lower connection number, or the same connection number but lower node id, and if that is the case then the present node will move on to the next pair, since this pair is connected by an active artery node regardless of the present node. But if no such active artery node was found, or the present node's connection number has recently changed, then the present node is an active artery node and the algorithm terminates. If the present node exhausts the list of neighbor pairs without becoming an artery node, then the present node must be a non-artery node in a step 610 (or a deprecated artery node if it was recently an active one).

If the present node was an active or deprecated artery node in the previous iteration of this algorithm, and the above conditions are not met in the current iteration, then the present node may be designated as a deprecated artery node. A deprecated node is an artery node that it is no longer needed as an artery node. This can happen via topology changes due to mobility or nodes joining the network, or during startup. To handle this, it is suggested that an artery node may cease to be an artery node after running the selection algorithm a number of consecutive times with a negative result each time. This preserves some stability, prevents possible thrashing, and also reduces the impact of a "fast mover" in the network. According to an exemplary embodiment, if the present node is a deprecated artery node for 5 consecutive iterations of this algorithm, then the present node may become a non-artery node.

It may be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and logic to accomplish the various database searching steps, correlation steps, comparison steps and decision steps. It may also be noted that the word "component" as used herein and in the claims is intended to encompass implementations using one or more lines of software code, and/or hardware implementations, and/or equipment for receiving manual inputs.

Embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which ca be used to carry or stored desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods described herein. The particular sequence of such executable instructions or associated data structures represent examples of corresponding acts for implementing the functions described in such steps.

While the detailed drawings, specific examples, and particular formulations given described preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communication bus or processor used may differ. The systems and methods depicted and described are not limited to the precise details and conditions disclosed. Furthermore, other substitutions, modifications, changes, and omissions may be made in the design, operating conditions, and arrangement of the exemplary embodiment without departing from the scope of the invention as expressed in the appended claims.

What is claimed is:

1. A system for optimizing an ad-hoc network, comprising: a plurality of nodes, wherein each node includes a computer implemented application configured to:
   a. determine that a present node has a link node classification when the present node is the only node connecting a pair of nodes in the ad-hoc network on a two-hop connection, wherein the two-hop connection is the only two-hop connection connecting the pair of nodes and wherein the two nodes of the pair of nodes are not otherwise directly connected;

b. determine a connection number for the present node, wherein if the present node does not have the link node classification, the connection number is a number of two-hop connections having the present node as an intermediary node and having the two end nodes of each connection not otherwise directly connected; and c. determine whether the present node should be classified as an artery node based on the link node classification or the connection number.

2. The system of claim 1, wherein the connection number is set to infinity if the present node has the link node classification.

3. The system of claim 1, wherein the computer implemented application is further configured to broadcast to and receive from other nodes within the ad-hoc network connection numbers and active artery node statuses.

4. The system of claim 3, wherein the computer implemented application is further configured to determine whether the present node should be classified as an artery node based on the received connection numbers and active artery node statuses from the other nodes.

5. The system of claim 3, further including determining whether a node previously designated as an artery node should no longer be classified as an artery node based on the received connection numbers and active artery node statuses from the other nodes.

6. The system of claim 3, wherein the broadcasted connection numbers and active artery node statuses include the connection number and active artery node status for the present node and the connection numbers and active artery node statuses for the 1-hop neighbors of the present node.

7. A computer implemented method for optimizing an ad-hoc network, the method comprising:

determining that a present node has a link node classification when the present node is the only node connecting a pair of nodes in the ad-hoc network on a two-hop connection, wherein the two-hop connection is the only two-hop connection connecting the pair of nodes and wherein the two nodes of the pair of nodes are not otherwise directly connected;

determining a connection number for the present node, wherein if the present node does not have the link node classification, the connection number is a number of two-hop connections having the present node as an intermediary node and having the two end nodes of each connection not otherwise directly connected; and determining whether the present node should be classified as an artery node based on the link node classification or the connection number.

8. The method of claim 7, wherein the connection number is set to infinity if the present node has the link node classification.

9. The method of claim 7, further including broadcasting to and receiving from other nodes within the ad-hoc network connection numbers and active artery node statuses.

10. The method of claim 9, further including determining whether the present node should be classified as an artery node based on the received connection numbers and active artery node statuses from the other nodes.

11. The method of claim 9, further including determining whether a node previously designated as an artery node should no longer be classified as an artery node based on the received connection numbers and active artery node statuses from the other nodes.

12. The method of claim 11, further including classifying the artery node that should no longer be classified as an artery node as a deprecated artery node during a waiting period.

13. The method of claim 9, wherein the broadcasted connection numbers and active artery node statuses include the connection number and active artery node status for the present node and the connection numbers and active artery node statuses for 1-hop neighbors of the present node.

14. A tangible machine readable medium for optimizing an ad-hoc network, comprising machine-readable program code for causing, when executed, one or more machines to perform the following method steps:

a. determine that a present node has a link node classification when the present node is the only node connecting a pair of nodes in the ad-hoc network on a two-hop connection, wherein the two-hop connection is the only two-hop connection connecting the pair of nodes and wherein the two nodes of the pair of nodes are not otherwise directly connected;

b. determine a connection number for the present node, wherein if the present node does not have the link node classification, the connection number is a number of two-hop connections having the present node as an intermediary node and having the two end nodes of each connection not otherwise directly connected; and c. determine whether the present node should be classified as an artery node based on the link node classification or the connection number.

15. The machine readable medium of claim 14, wherein the connection number is set to infinity if the present node has the link node classification.

16. The machine readable medium of claim 14, wherein the program code is further configured to broadcast to and receive from other nodes within the ad-hoc network connection numbers and active artery node statuses.

17. The machine readable medium of claim 16, further including determining whether the present node should be classified an artery node based on the received connection numbers and active artery node statuses from the other nodes.

18. The machine readable medium of claim 16, further including determining whether a node previously designated as an artery node should no longer be classified as an artery node based on the received connection numbers and active artery node statuses from the other nodes.

19. The machine readable medium of claim 18, further including classifying the artery node that should no longer be classified as the artery node as a deprecated artery node during a waiting period.

20. The machine readable medium of claim 16, wherein the broadcasted connection numbers and active artery node statuses include the connection number and active artery node status for the present node and the connection numbers and active artery node statuses for 1-hop neighbors of the present node.

* * * * *